US012356148B2

(12) United States Patent
Ruparel et al.

(10) Patent No.: US 12,356,148 B2
(45) Date of Patent: Jul. 8, 2025

(54) ACOUSTICS FIXTURE FOR MANUAL OR AUTOMATED TESTING AND/OR CALIBRATION OF HEARING DEVICES

(71) Applicant: Eargo, Inc., San Jose, CA (US)

(72) Inventors: Hardik Ruparel, Milpitas, CA (US); Dominick Piccininni, Sonora, CA (US); Anthony Dinh, San Jose, CA (US); Iain Butler, Pleasant Hill, CA (US)

(73) Assignee: Eargo, Inc., San Jose, CA (US)

( * ) Notice: Subject to any disclaimer, the term of this patent is extended or adjusted under 35 U.S.C. 154(b) by 307 days.

(21) Appl. No.: 18/129,667

(22) Filed: Mar. 31, 2023

(65) Prior Publication Data

US 2023/0362553 A1 Nov. 9, 2023

Related U.S. Application Data

(60) Provisional application No. 63/338,718, filed on May 5, 2022.

(51) Int. Cl.
*H04R 25/00* (2006.01)
*G10K 11/18* (2006.01)

(52) U.S. Cl.
CPC ........... *H04R 25/30* (2013.01); *H04R 25/554* (2013.01); *G10K 11/18* (2013.01)

(58) Field of Classification Search
CPC ...... H04R 25/30; H04R 25/554; H04R 25/33; H04R 25/305; H04R 25/70; H04R 29/00; H04R 1/1016; G10K 15/04; G10K 2210/1081
See application file for complete search history.

(56) References Cited

U.S. PATENT DOCUMENTS 7,003,128 B2 * 2/2006 Boonen .................. H04R 25/30
381/322
2016/0286321 A1 * 9/2016 Cole ...................... H04R 25/30

FOREIGN PATENT DOCUMENTS

CA 2885980 A1 * 9/2016 ............. H04R 25/30

OTHER PUBLICATIONS

American National Standard Specification of Hearing Aid Characteristics, ANSI S3.22, 2003, pp. iv-vii and 1-33.
GRAS RA-0038 coupler, pp. 1-3, downloaded May 23, 2023.
Listen Sound Measurements Make Sound Products, Listen, Inc., pp. 1-2, downloaded May 23, 2023.

* cited by examiner

*Primary Examiner* — Sunita Joshi
(74) *Attorney, Agent, or Firm* — Law Office of Alan W. Cannon

(57) ABSTRACT

A fixture assembly can be used for testing and calibrating hearing devices in a fast, reliable and repeatable manner. The fixture assembly includes a support frame that supports an arm assembly with a holder to hold acoustics coupler(s) and hearing device for the purpose of acoustic testing and calibration.

23 Claims, 14 Drawing Sheets

1000

1100

ANSI S3.22 Acoustic Results

| | | | | |
|---|---|---|---|---|
| HFA - OSPL90 | 107.4 dB | ✓ | Max/Min | 109.0/101.0 |
| Max - OSPL90 | 108.5 dB | ✓ | Maximum | 114.0 |
| HFA - FOG | 26.1 dB | ✓ | Max/Min | 31.0/21.0 |
| EIN | 31.1 dB | ✓ | Maximum | 36.0 |
| THD 500Hz | 400m % | ✓ | Maximum | 5.0 |
| THD 800Hz | 400m % | ✓ | Maximum | 5.0 |
| THD 1600Hz | 700m % | ✓ | Maximum | 4.0 |
| OSPL90 - curve margin | 2.6 dB | ✓ | Tolerance curves | Absolute Limits |
| FOG50 - margins | 3.6 dB | ✓ | Tolerance curves | Absolute Limits |
| FR 60dBSPL margin | 3.2 dB | ✓ | Tolerance curves | Absolute Limits |
| IFT Test | 1 | ✓ | | |

FIG. 11

ACOUSTICS FIXTURE FOR MANUAL OR AUTOMATED TESTING AND/OR CALIBRATION OF HEARING DEVICES

CROSS-REFERENCE

This application claims the benefit of U.S. Provisional Application No. 63/338,718, filed May 5, 2022, which application is hereby incorporated herein, in its entirety, by reference thereto.

FIELD OF THE INVENTION

This invention relates to the field of hearing devices. More particularly, this invention relates to systems and methods for manual or automated testing and/or calibration of hearing devices.

BACKGROUND OF THE INVENTION

Reliable, repeatable and rapid testing of hearing devices and associated transducers (e.g., speakers, microphones) are advantageous for both production and research and development of hearing devices.

Hearing devices and in particular, hearing aids, need to be accurately tested for acoustics characteristics such as outlined in ANSI S3.22 standards. Additionally, there may be a need for the ability to perform other acoustics and electroacoustics tests developed in house and any particular production or research and development facility. Variations that may occur in transducer (microphone and receivers) sensitivity from various suppliers frequently occurs and needs to be addressed/accounted for in order to provide a consistent end product (hearing device) which does not vary depending upon which manufacturer was used to supply a transducer. In this way, all hearing devices from a producer can be assembled, built and tested to have the same output characteristics and levels irrespective of component variations.

The process of testing hearing aid/hearing device acoustics per the standard, calibrating hearing aid/hearing device gains should be reliable, repeatable and efficient; particularly when be used for testing in a production environment. Moreover, the process of going into the ANSI test mode, running acoustics test, applying calibration offsets based on test results, going from ANSI test mode to production mode; if automated can be much more time efficient than manual processes that currently exist.

There is a current need for a system capable of programming hearing devices and performing testing and calibration of hearing devices There is a current need to provide a system capable of delivering fast, accurate and reliable results in repetitive testing environments such as on the production floor.

SUMMARY OF THE INVENTION

The present invention enables reliable, repeatable and rapid testing of hearing devices and calibration of the transducers of the hearing devices.

A fixture is provided that allows an operator to insert a hearing device therein, test and place the hearing device under a hearing test instrument quickly in an acoustics coupler, thereby providing improvements in a production environment. To supplement the process efficacy, a fixture can be configured so that an arm thereof can be moved outwardly to an "open" configuration for undisturbed acoustical testing of the hearing device. After the acoustical testing, the arm can be moved inwardly to a "closed" configuration, for writing calibration values by communicating to the hearing device. All of these procedures can be performed in automated manner to yield very high throughput in a production environment.

In order to provide best results ("clean" results), the hearing device and the fixture assembly should both be placed in relative sound isolation, such as by placement in a sound isolating acoustic chamber and maintained there during the testing and calibration procedures.

In at least one embodiment, further benefits are provided by the acoustic fixture assembly being configured so that it can be easily adapted to different physical geometries of the test environment, such as for use with different acoustic chambers.

The fixture assembly does not significantly disturb the sound field it is tested in and is configured for equalization of the response of the test speaker and acoustic chamber with fixture assembly added. This is important as it can have a direct impact on test results and calibration.

According to one aspect the present invention, an acoustics fixture assembly facilitating manual and/or automated testing and/or calibration of a hearing device is provided to include: a frame configured and dimensioned to securely sit in an acoustic/anechoic chamber for performing the testing and/or calibration; a bracket coupler support mounted on said frame and configured to receive and secure an acoustic coupler to the frame; an arm assembly comprising an arm rotationally mounted to the frame and an actuator configured to provide a driving force to drive rotation of the arm; wherein, in a closed configuration, an end of the arm aligns with an opening in the bracket coupler support so that the end of the arm is aligned with a hearing device when mounted to an acoustic coupler when mounted in the bracket coupler support; and wherein, in an open configuration, the end of the arm is rotated away from alignment with the opening in the coupler support, so as not to interfere with acoustical testing of the hearing device when mounted to the acoustic coupler when mounted in the bracket coupler support.

In at least one embodiment, a free end portion of the arm comprises a transmit coil configured to communicate with a receive coil in the hearing device when mounted in the acoustic coupler when mounted in said bracket coupler support, and when the arm assembly is in the closed configuration.

In at least one embodiment, the acoustics fixture assembly further includes the acoustic coupler secured by the bracket coupler support.

In at least one embodiment, the acoustics fixture assembly further includes the hearing device mounted to the acoustic coupler secured by the bracket coupler support.

In at least one embodiment, the acoustics fixture assembly further includes a diaphragm acoustically sealing the hearing device to the acoustics coupler.

In at least one embodiment, a first end of said diaphragm is inserted into an end of said acoustic coupler, an end of said hearing instrument is inserted into an opposite end of said diaphragm.

In at least one embodiment, the frame is adjustable so that the dimensions of the frame can be varied to fit in various sizes of acoustic/anechoic chambers.

In at least one embodiment, the acoustics fixture assembly further includes an electronics control system comprising an actuator control module configured to interact with the actuator to control movements of the arm.

In at least one embodiment, the acoustics fixture assembly further includes an electronics control system comprising: an actuator control module configured to interact with the actuator to control movements of the arm; and a communication module configured to interact with the transmit coil to transmit communications from the transmit coil.

In at least one embodiment, the acoustics fixture assembly is placed in the acoustic/anechoic chamber, wherein the acoustic/anechoic chamber comprises inner walls and the frame contacts the inner walls, thereby preventing the acoustics fixture from sliding and maintaining the acoustic fixture in a fixed position relative to the acoustic/anechoic chamber.

In at least one embodiment, the acoustic/anechoic chamber includes a test speaker configured to send out a test signal for acoustic testing of a hearing device when mounted to the frame via the acoustic coupler.

According to another aspect of the present invention, a method of testing and calibration of a hearing device includes: installing an acoustics fixture assembly in an acoustic/anechoic chamber such that the acoustics fixture assembly securely sits in the acoustic/anechoic chamber, wherein the acoustics fixture assembly includes an acoustics coupler mounted to a frame of the acoustics fixture assembly; mounting a hearing device to acoustics coupler; closing the chamber and equalizing an acoustic space within the chamber; performing an acoustics test on the hearing device while an arm of the arm assembly of the acoustics fixture assembly is in an open configuration; automatically moving the arm from the open configuration to a closed configuration; calibrating the hearing device; automatically moving the arm from the closed configuration to the open configuration upon completion of said calibrating; and removing the hearing device from the acoustics coupler.

In at least one embodiment, the method further includes determining whether another hearing device is to be processed; ending the method when it is determined that another hearing device is not to be processed; and when it is determined that another hearing device is to be processed, mounting another hearing device to the acoustics coupler, and repeating said closing, performing an acoustics test, automatically moving the arm to the closed position, calibrating, automatically moving the arm to the open configuration and removing the another hearing device.

In at least one embodiment, the acoustics testing and calibrating are automatically performed.

In at least one embodiment, the closing and equalizing are automatically performed.

In at least one embodiment, the calibrating is performed by wireless communication.

In at least one embodiment, the method further includes at least one of: adjusting the width of the frame so that said frame fits in and contacts inner walls of the acoustic/anechoic chamber; and adjusting the length of the frame so that said frame fits in and contacts inner walls of the acoustic/anechoic chamber.

According to another aspect of the present invention, a system for facilitating manual and/or automated testing and/or calibration of a hearing device includes: an acoustic/anechoic chamber having inner walls, a floor and a lid defining an acoustic chamber; and an acoustics fixture assembly comprising: a frame configured and dimensioned to securely sit in the acoustic/anechoic chamber for performing the testing and/or calibration, wherein the frame contacts the inner walls, thereby preventing the acoustics fixture assembly from sliding and maintaining the acoustic fixture assembly in a fixed position relative to the acoustic/anechoic chamber; a bracket coupler support mounted on the frame and configured to receive and secure an acoustic coupler to the frame; an arm assembly comprising an arm rotationally mounted to the frame and an actuator configured to provide a driving force to drive rotation of the arm; wherein, in a closed configuration, an end of the arm aligns with an opening in the bracket coupler support so that the end of the arm is aligned with a hearing device when mounted to an acoustic coupler when mounted in the bracket coupler support; and wherein, in an open configuration, the end of the arm is rotated away from alignment with the opening in the coupler support, so as not to interfere with acoustical testing of the hearing device when mounted to the acoustic coupler when mounted in the bracket coupler support.

In at least one embodiment, the system further includes the acoustic coupler secured by the bracket coupler support.

In at least one embodiment, the system further includes the hearing device mounted to the acoustic coupler secured by the bracket coupler support.

In at least one embodiment, the system further includes a diaphragm acoustically sealing the hearing device to the acoustics coupler.

In at least one embodiment, the system further includes an electronics control system comprising: an actuator control module configured to interact with the actuator to control movements of the arm; and a communication module configured to interact with a transmit coil on the arm to transmit communications from the transmit coil.

In at least one embodiment, the acoustic/anechoic chamber includes a test speaker configured to send out a test signal for acoustic testing of a hearing device when mounted to the frame via the acoustic coupler.

These and other advantages and features of the invention will become apparent to those persons skilled in the art upon reading the details of the devices, assemblies and methods as more fully described below.

BRIEF DESCRIPTION OF THE DRAWINGS

At least one preferred embodiment of the present invention is shown and described herein. The present invention may include further different embodiments, the details of which may be modified in various, obvious aspects without departing from the scope of the invention. Accordingly, the drawings and descriptions will be regarded as illustrative in nature and not as restrictive.

FIG. 11 is a table showing results and tolerances defined for various other acoustics metrics characterizing the performance of the hearing aid as tested and calibrated in the below-described Example, according to an embodiment of the present invention.

DETAILED DESCRIPTION OF THE INVENTION

Figure 1A:
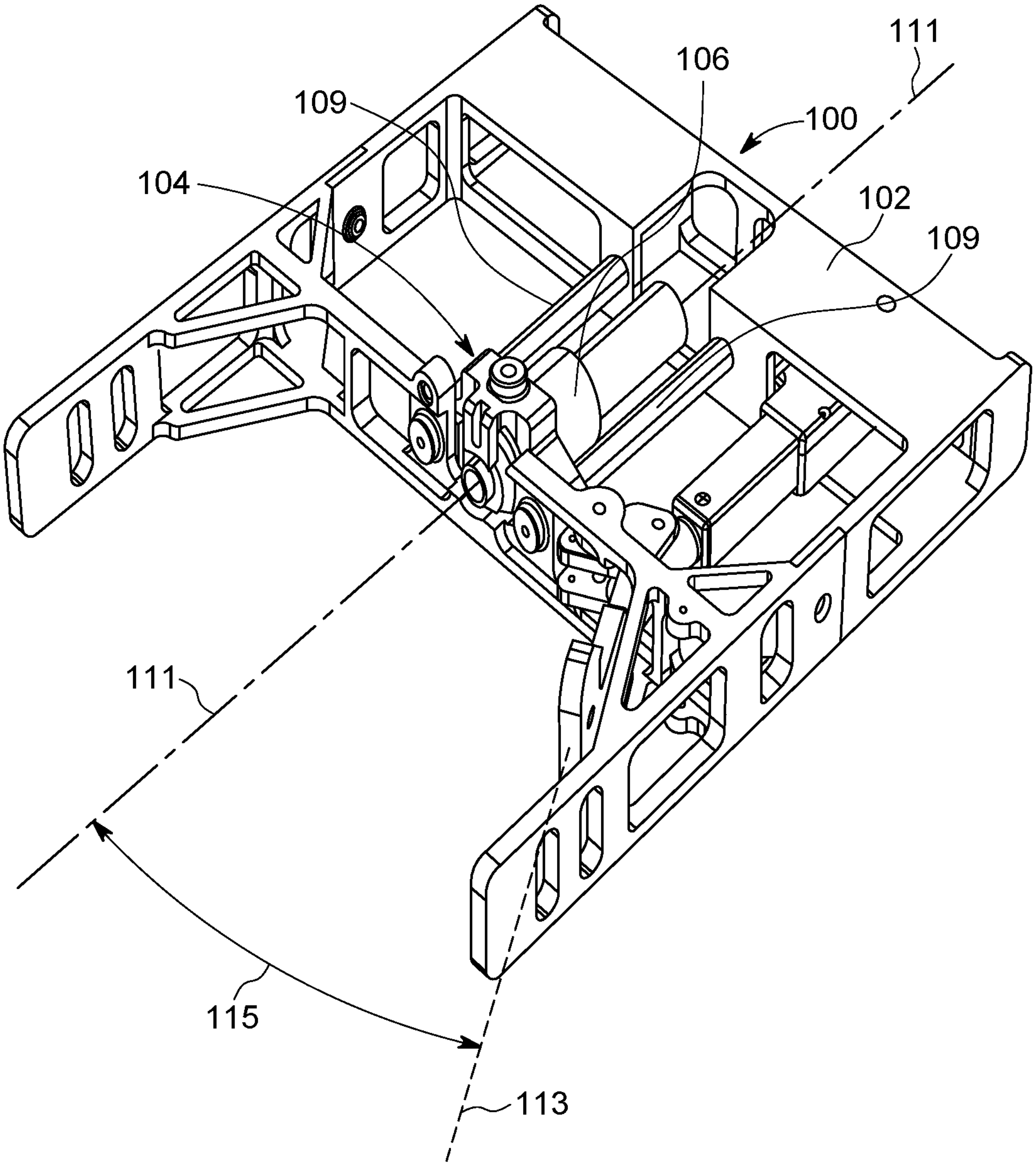
FIG. 1A is a perspective view of an acoustic fixture assembly with the arm assembly in an open configuration, according to an embodiment of the present invention.

Before the present devices, assemblies and methods are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a hearing device" includes a plurality of such hearing devices and reference to "the microphone" includes reference to one or more microphones and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

A hearing device typically includes a microphone, a speaker/receiver and an amplifier configured to amplify sound received in the form of a signal from the microphone to an amplified signal that is output from the speaker as a sound that is amplified relative to the amplitude of the sound inputted to the microphone. One or more processors may be provided not only to control the amplifier, but to further process the signal. Examples of hearing devices include, but are not limited to: headsets, hearing aids, public address systems, telephones, radios, cochlear implants, bone conduction devices and personal listening devices.

Referring now to FIG. 1A, an acoustic test fixture is shown, according to an embodiment of the present invention. Fixture assembly 100 can be used for testing and calibrating hearing devices in a fast, reliable and repeatable manner Fixture assembly 100 includes a support frame 102 that supports the other components of the assembly as well as a hearing device during testing and calibration. The support frame 102 is configured and dimensioned to securely sit in an acoustic/anechoic chamber for performing the testing and calibration. Frame 102 may be cast, machined or otherwise manufactured from a variety of materials, or may be 3-D printed, such as printing using H6K (a liquid polymer used in the 3-D printing process) as the printing material. In at least one example, frame 102 was manufactured by ProtoCafe, Newark California. Alternative materials for making the frame include, but are not limited to: polyether ether ketone (PEEK), rigid plastics, rigid polymers; ceramics, ceramic polymers and/or other composites.

In at least one embodiment, frame 102 is configured and dimensioned so that the peripherals of the frame can securely sit in an acoustic/anechoic chamber by Bruel & Kjaer BNK4232. However, this is only one example and the frame 102 and frame assembly 102 are not limited to use with that particular chamber, as the frame 102 can be dimensioned to securely fit within chambers of different sizes. Additionally or alternatively, frame 102 may adjustable, so that its dimensions can be varied to fit in various sizes of chambers. Thus frame 102 can be dimensioned to securely fit within chambers of different sizes. The frame contacts inner walls of the chamber and this prevents it from sliding/moving from its placement. The inner walls of the chamber may be lined with sound absorbing foam in which case the frame, when placed, applies slight pressure against the foam and this keeps the frame secured from sliding.

Bracket coupler support 104 is mounted on frame 102 and is configured to receive and secure an acoustic coupler 106 used to couple a hearing device thereto for conducting the testing and calibration. In one example a GRAS RA0038 acoustic coupler can be used, but the present invention is not limited to this specific coupler, as other acoustic couplers could be substituted. By mounting the acoustic coupler 106 in a fixed position defined by the bracket coupler support 104, this ensures that each hearing device that is mounted to the acoustic coupler (for example, when testing and calibrating multiple hearing devices in a production process) is maintained in a reference test position defined by the fixed coupler, that is the exact same position for each hearing device.

Figure 1B:
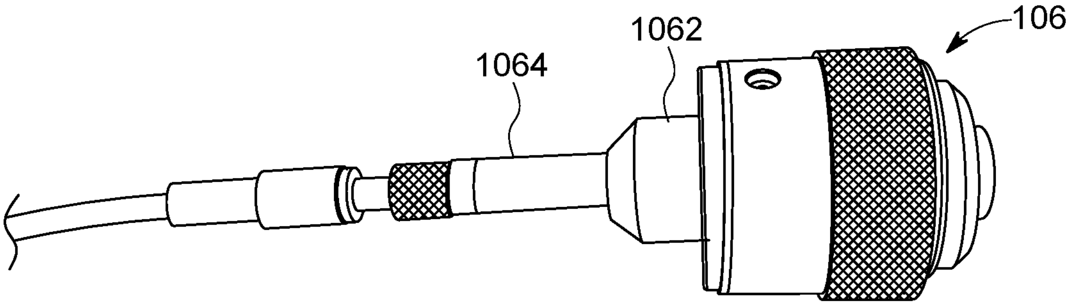
FIG. 1B is an isolated view of an example of an acoustics coupler that may be mounted in an acoustics fixture assembly in a manner as illustrated in FIG. 1A.

A reference microphone and preamplifier may be housed in the acoustic coupler at the locations 1062 and 1064, shown in FIG. 1B and used to record acoustic output from the hearing device mounted thereto.

Figure 2A:
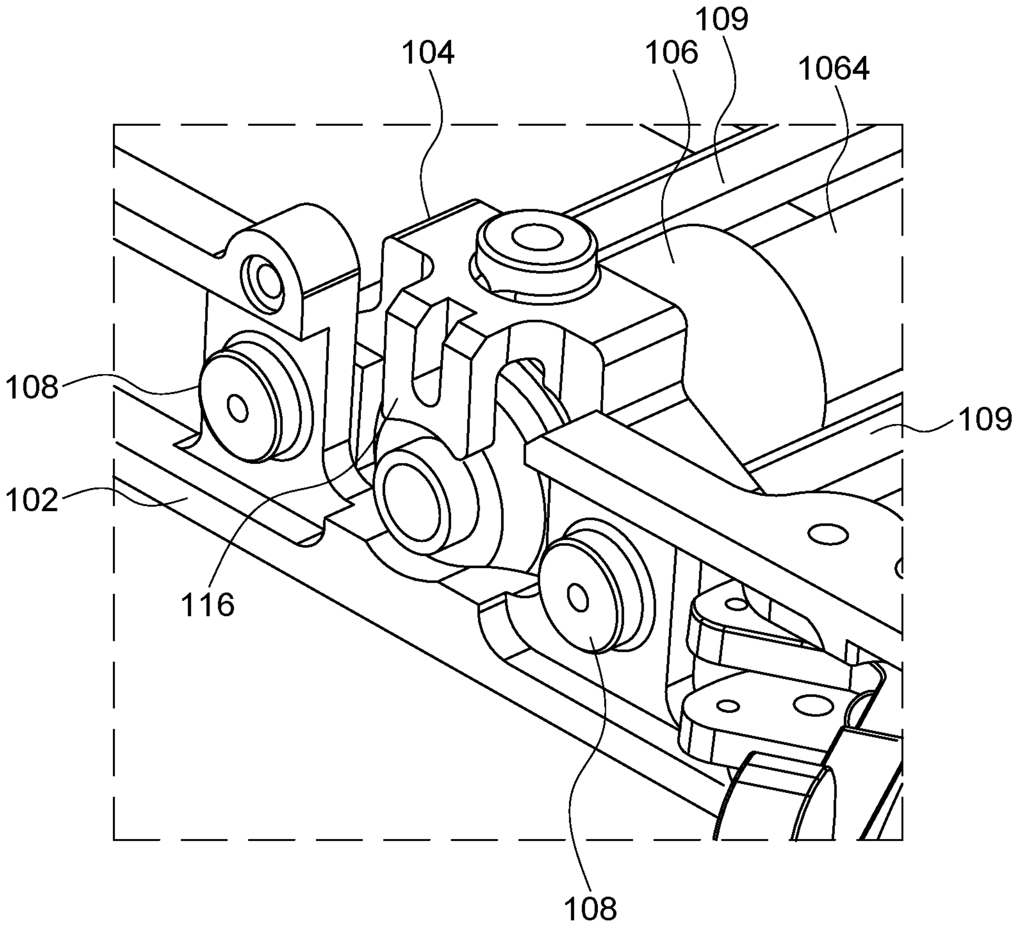
FIG. 2A is an enlarged, partial view of the fixture of FIG. 1A that shows the bracket coupler support and acoustic coupler in better detail.

FIG. 2A is an enlarged, partial view of the assembly of FIG. 1A that shows the bracket coupler support 104 and acoustic coupler 106 in better detail. The bracket coupler support 104 is fixed to the frame 102 so that it defines a fixed, reference location in which the coupler 106 is mounted and a fixed location where a hearing device can be inserted. The bracket coupler support 104 may be removably fixed to the frame 102, such as by using standoffs 109 that can be screwed into threaded (e.g., tapped) openings 108 through holes 110 (see FIG. 2B), bolts, or other fixing features that allow removal and replacement of the bracket coupler support 104. Additionally, the opposite ends of the standoffs 109 can be threaded into the frame 102 to provide further structural rigidity, e.g., see FIG. 1A. In at least one embodiment, standoffs 109 are made of aluminum. The standoffs 109 could alternatively be made of other metal, metal alloy, rigid polymer or other rigid material. Alternatively, the bracket coupler support 104 could be made integral with the frame 102, such as by gluing, welding, integrally made such as by 3D printing, or other method of integrating the components.

Figure 2B:
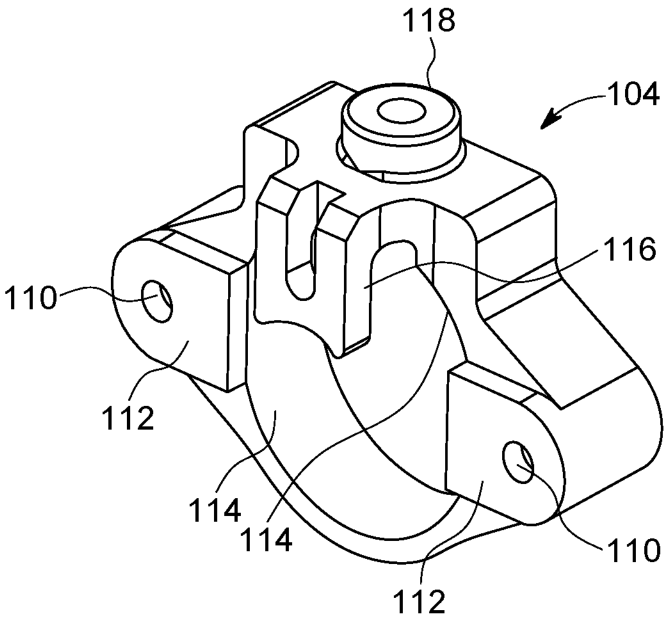
FIG. 2B is an isolated view of the bracket coupler support of FIGS. 1 and 2A.

FIG. 2B is an isolated view of the bracket coupler support 104 of FIGS. 1 and 2A. The bracket coupler support 104 has mounting surfaces 112 configured to contact the frame 102 where it is mounted and oriented in a fixed reference position to receive an acoustic coupler 106. Inner surfaces 114 are designed to generally conform to and contact the acoustic coupler 106 for mounting purposes. As the acoustic coupler 106 is inserted into the bracket coupler support 104, a stop 116 stops the acoustic coupler 106 from being inserted any further (see FIG. 2A) and defines the end placement of the acoustic coupler 106 in the fixed reference location. The acoustic coupler 106 slips into the bracket coupler support 104 and is fixed in the fixed reference location shown in FIG. 2A. In the embodiment shown in FIG. 2A, fixation of the acoustic coupler 106 to the bracket 104 can be accomplished by turning in a set screw 118 to abut against the coupler 106 and lock the acoustic coupler in its position.

Alternatively, the bracket coupler support 104 could be designed with a hinge so that it opens up and allows the coupler 106 to be received in the bottom portion thereof, after which the top portion could be closed over the coupler 106 and torqued down to fix it in position. Still other alternative designs could be used to make the bracket coupler support 104, so long as it carries out the desired functions of receiving and fixing an acoustic coupler 106 in a fixed reference position relative to the frame 102. Also, by designing the bracket coupler support 104 to be removably fixed to the frame 102, this allows it to be removed and replaced by other bracket coupler supports 104 designed to accommodate acoustic couplers 106 of different dimensions. Like the frame 102, the bracket coupler support 104 may be cast, machined or otherwise manufactured from a variety of materials, or may be 3-D printed, such as printing using H6K or other material as the printing material. Alternative materials for making the frame include, but are not limited to: PEEK or other rigid polymer, rigid plastics and/or composites.

Figure 4A:
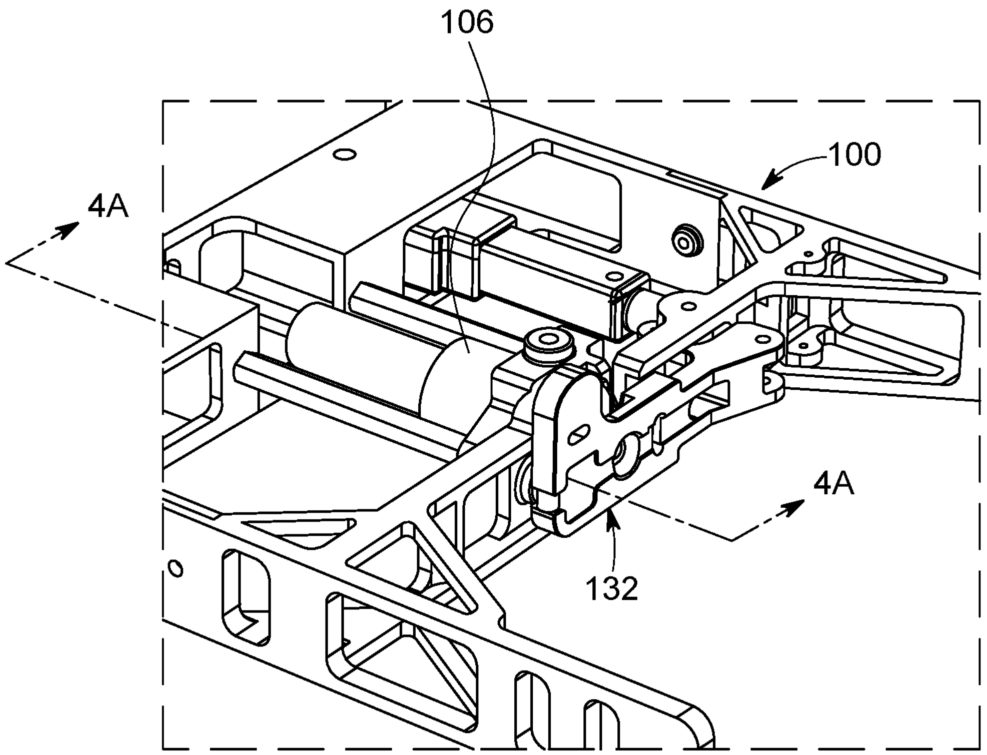
FIG. 4A is an enlarged partial view of the fixture assembly of FIG. 1A that shows the arm assembly in a closed configuration, according to an embodiment of the present invention.
Figure 4B:
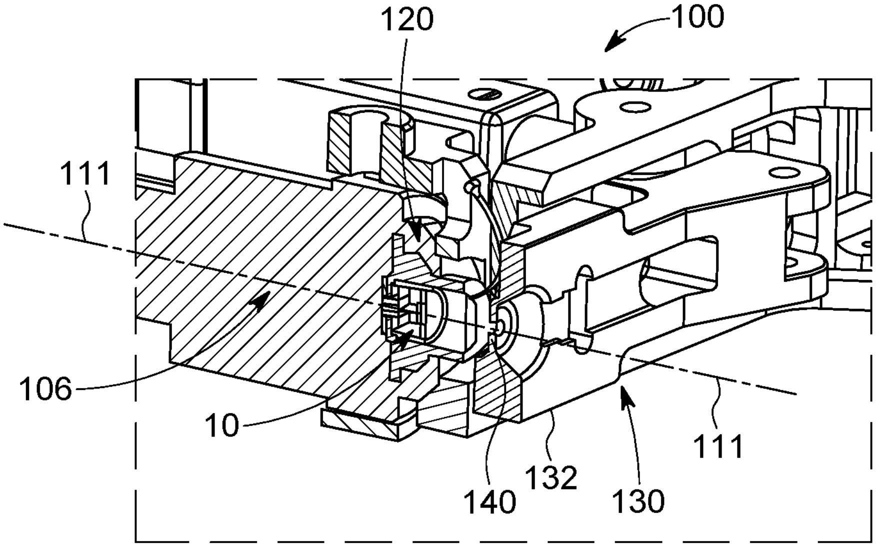
FIG. 4B is a sectional view of FIG. 4A taken along line 4A-4A.

Bracket coupler support 104 is configured to accommodate acoustic coupler 106 in alignment with a hearing device 10, as shown in FIGS. 4A-4B.

Figure 2C:
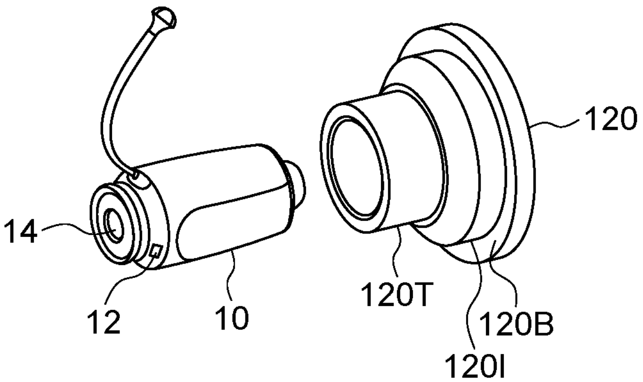
FIG. 2C shows a diaphragm and hearing device, wherein the diaphragm is configured to join the hearing device to the acoustic coupler.
Figure 4C:
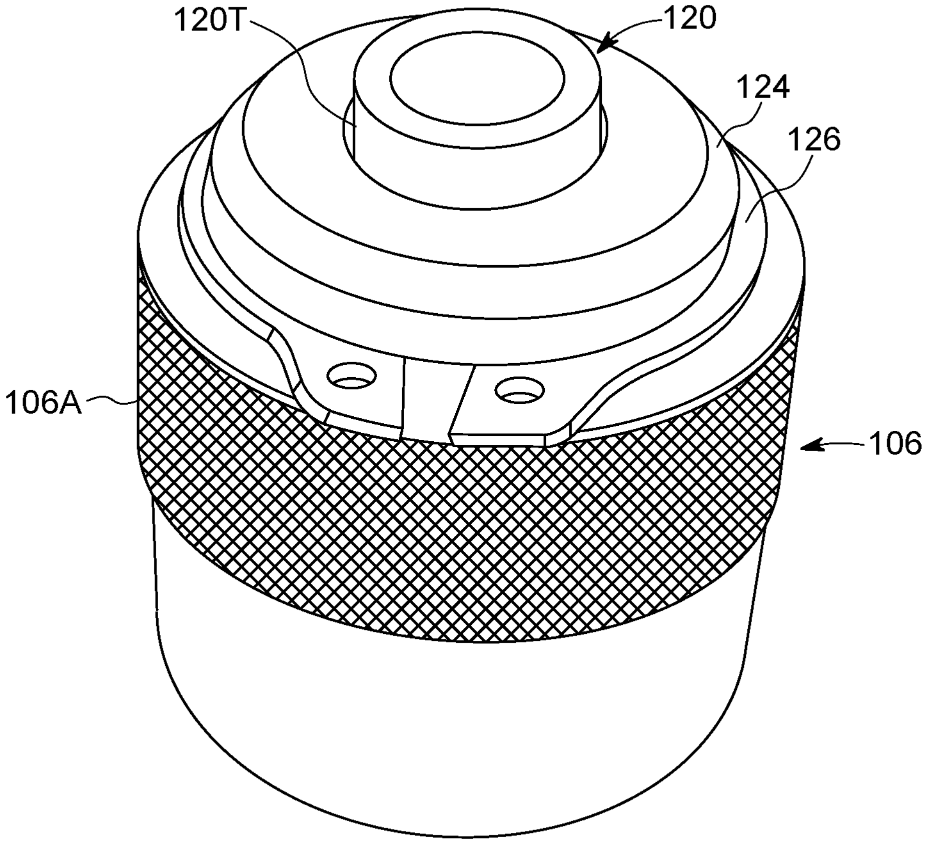
FIG. 4C is an isolated view of an acoustic coupler and a diaphragm, wherein one end of the diaphragm has been inserted into an opening at an end of the acoustic coupler, according to an embodiment of the present invention.

A diaphragm 120 (see FIGS. 2C and 4B) may be provided for insertion into the coupler 106. The diaphragm 120 may be 3-D printed, for example, from an elastomer, such as rubber or other elastomer. A preferred hardness is 60 Shore A, although other hardnesses could be substituted. A preferred elastomer was elastic 60 Shore A. The diaphragm 120 at one end is inserted into the end of the acoustic coupler 106 (diaphragm 120 having been inserted into coupler 106 is shown in FIG. 4C) and a hearing instrument 10 is inserted into an opening provided at the other end of the diaphragm so as to align the hearing device 10 with the acoustic coupler 106 (see FIG. 4B). The diaphragm may be, but is not necessarily 3-D printed and is dimensioned to be inserted, at one end into an acoustic coupler 106 of specified end dimensions, and is dimensioned to receive a hearing device 10 of specified dimensions at the other end so as to form acoustic seals with both the hearing device 10 and the acoustic coupler 106. Diaphragm 120 is designed to facilitate easy and accurate insertion of the hearing device 10 for measurements, and so that the hearing device 10 can be easily removed. The diaphragm 120 holds the hearing device 10 in place snug and in proper position and orientation. The diaphragm 120, by its sealing functions, prevents sound leakage from the receiver to the microphone of the hearing device, and this is important for providing accurate sound measurements during testing.

Figure 4D:
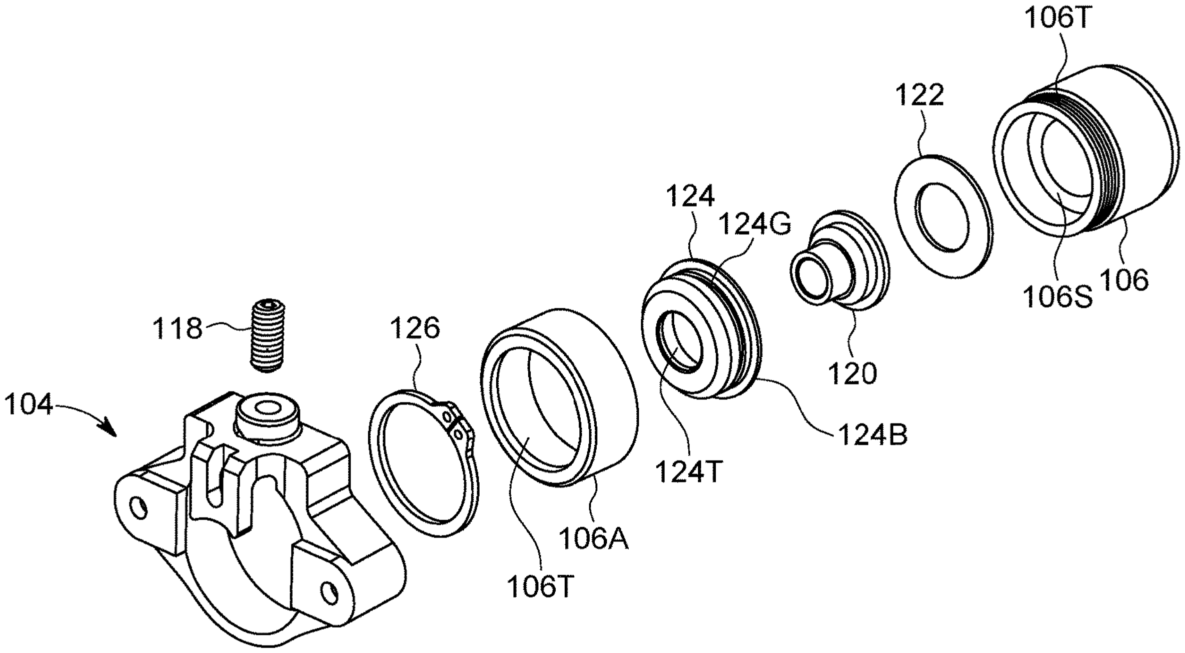
FIG. 4D is an exploded view of an acoustic coupler adjacent a bracket coupler support and showing subcomponents used for the insertion of a diaphragm into the acoustic coupler, according to an embodiment of the present invention.

FIG. 4D is an exploded view of an acoustic coupler 106 adjacent bracket coupler support 104 and showing subcomponents used for the insertion of diaphragm 120 into the acoustic coupler 106 and maintenance of the diaphragm 120 in the inserted position. A threaded top ring 106A of the acoustic coupler 106 can be unscrewed and removed to expose a top opening of the acoustic coupler 106 into which the diaphragm 120 can be inserted. A diaphragm support 122 such as a metallic washer (e.g., stainless steel or other metal or rigid polymer) in inserted prior to insertion of the diaphragm 120 to seat on a shoulder 106S and provide a broadened base upon which the bottom surface of the diaphragm is supported. An upper diaphragm support 124 can be placed over the top of the diaphragm 120 to provide upper support thereto. The bottom opening 124B is sufficient to receive intermediate portion 1201 (see FIG. 2C) of diaphragm 120 therein, but has a bottom surface that compresses the bottom lip 120B against diaphragm support 122.

The top opening 124T in upper diaphragm support 124 allows the top portion 120T of diaphragm 120 to pass therethrough, but prevents the intermediate portion 1201 from passing therethrough. The bottom opening of top ring 106A is threaded and dimensioned to threadably engage the threads 106T on the main body of the acoustic coupler 106. The top opening 106T is sized to allow the top portion of the upper diaphragm support 124 to pass therethrough, but prevents the bottom portion of the upper diaphragm support 124 from passing therethrough. A groove 124G is provided in upper diaphragm support 124 that is dimensioned to receive split retaining ring 126 therein. When threaded top ring 106A is mounted over the upper diaphragm support 124 and threaded into engagement with the main body portion of the acoustic coupler 106, the top portion of the upper diaphragm support protrudes through the top opening 106T and the top portion 120T of the diaphragm 120 protrudes through the top opening 124T of the upper diaphragm support. By securing the retaining ring 126 in the groove 124G, this prevents secures the entire assembly, as the outside dimension (diameter) of the retaining ring 126 is greater than that of the opening 106T so that the retaining ring 126 cannot pass therethrough. FIG. 4C is a view of components having been assembled as described above.

Figure 3:
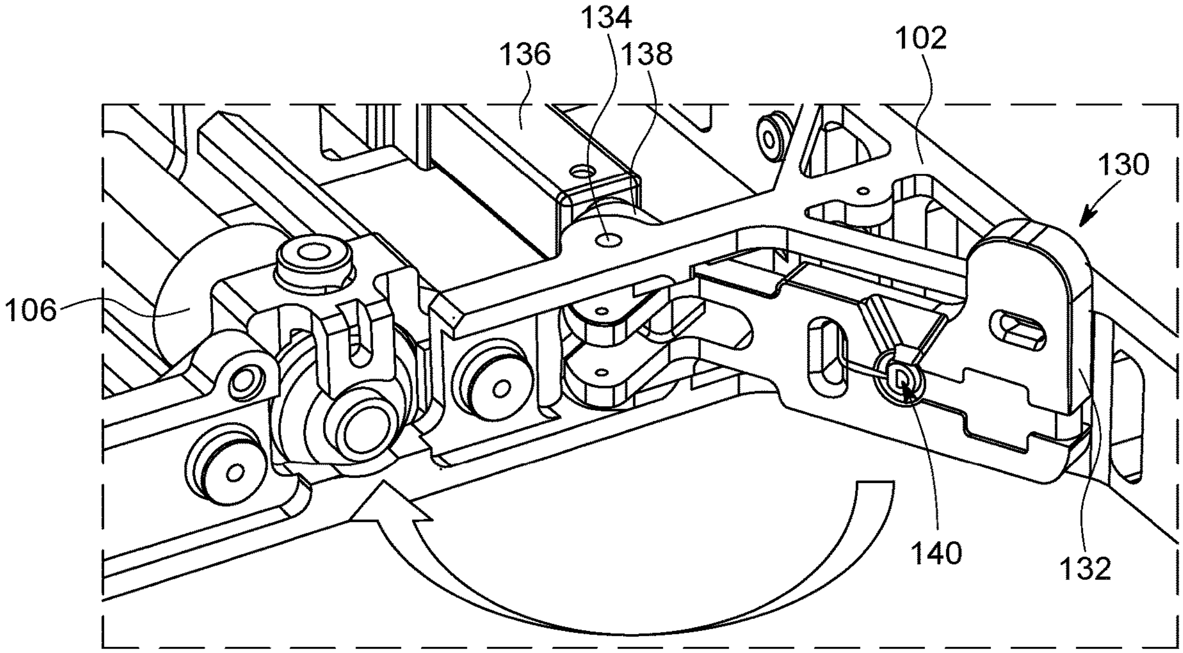
FIG. 3 is an enlarged partial view of the fixture assembly of FIG. 1A that shows an arm assembly in an open configuration, according to an embodiment of the present invention.

FIG. 3 is an enlarged partial view of the fixture assembly 100 of FIG. 1A that shows an arm assembly 130 in an open configuration, according to an embodiment of the present invention. The open configuration is such that the arm 132 of the arm assembly 130 has been rotated away from an alignment with the acoustic coupler 106 and hearing device 10 (hearing device 10 not shown in FIG. 3, but would be mounted in alignment with the acoustic coupler 106 as described above and as shown in FIG. 4B) to allow undisturbed acoustic testing of the hearing device 10. That is, in an open configuration, the axis 111 along which the acoustic coupler 106 (and hearing device 10 when mounted thereto) are aligned is not intersected or obstructed by the arm 132, as shown in FIGS. 1 and 3. Rather, the longitudinal axis 113 of the arm 132 forms an angle 115 with the axis 111, so that the arm 132 is out of the way of the hearing device 10 and couple 106 during acoustic testing. Arm 132 is rotationally mounted to frame 102 at 134. An actuator 136 such as a linear actuator or other driving mechanism is linked to a rotational component 138 formed at or fixed to an end of arm 132 and is configured to translate the linear motion of the actuator 136 to rotational motion of the arm 132. Actuator 136 is linked to the rotational component 138 so that when the actuator 138 advances toward the arm 132, it drives the rotational component 138 to rotate the arm toward the acoustic coupler 106, but when the actuator 136 moves away from the arm 132, it counter rotates the rotational component 138 to rotate the arm 132 away from the acoustic coupler 106 and to the open configuration shown in FIG. 3. Alternatively, the rotational component 138 can be spring biased toward the open configuration. In this alternative, the actuator 136 can drive the arm 132 to the closed configuration in the same manner as described above. However, the end of the actuator would not need to be attached to the rotational component. In this alternative, as the actuator moves away from the arm 132, the spring biasing of the rotational component would maintain contact of the rotation component 138 against the actuator 136 and would drive the rotation of the arm 132 to an open configuration. The amount of opening in each case will be determined by the location of the end of the actuator 136 when it stops moving. The rotational ranges of the arm 132 about the rotation point 134 form a closed configuration in alignment with the end of the acoustic coupler 106/hearing device 10 to an open configuration as shown in FIG. 3, can be up to about 120 degrees. It is noted that the arm can be stopped intermediately, if desired, at any angular location between these endpoints. For production processing however, the arm assembly may be programmed to automatically be driven between the closed configuration and the open configuration and vice versa, upon receiving predetermined instructions that may be manually inputted by an operator, or that may be automatically inputted as part of an automated production process. The opening and closing of the arm 132 can be adjusted by potentiometers 154 and 156, for example, see FIG. 7. For example, the end point of the open configuration can be adjusted by adjusting potentiometer 154 and the end point of the closed configuration can be adjusted by adjusting potentiometer 156.*

After the acoustical testing, the arm can be moved inwardly to a "closed" configuration, for calibration purposes by communication to the hearing device. All of these procedures can be performed in automated manner to yield very high throughput in a production environment. FIGS. 4A-4B show a hearing device (in this instance, a hearing aid) 10 having been mounted to the acoustic chamber 106 via diaphragm 120, with the arm mechanism 130 in the closed configuration.

The arm assembly 130 has a transmit coil 140 assembled into the arm 132. Transmit coil 140 is configured to communicate with a receive coil 12 located in the hearing device 10. This, when in the closed configuration, the free end of the arm 130 (and more particularly, the transmit coil 140) are placed in alignment with axis 111 along which the acoustic coupler 106 (and hearing device 10 when mounted thereto), as shown in FIGS. 4A-4B.

Figure 5A:
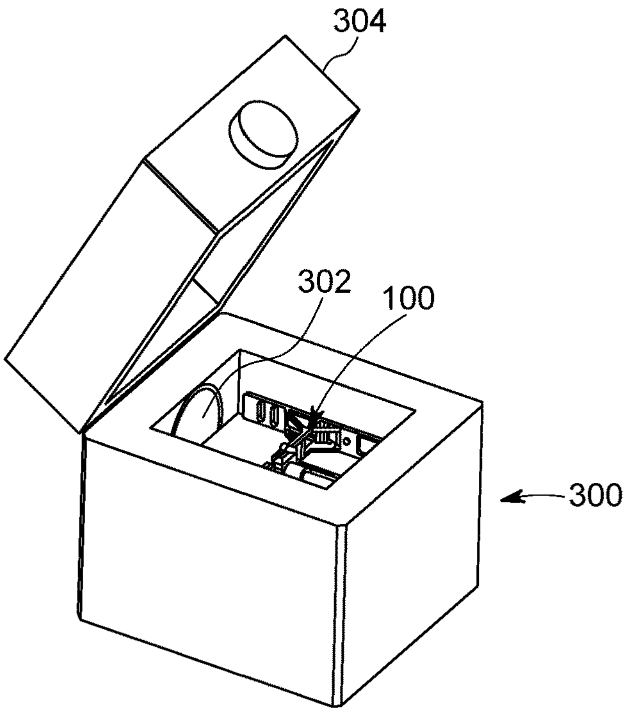
FIGS. 5A and 5B are views of a fixture assembly having been securely placed in an acoustic/anechoic chamber for performing testing and/or calibration of a hearing device, according to an embodiment of the present invention.
Figure 5B:
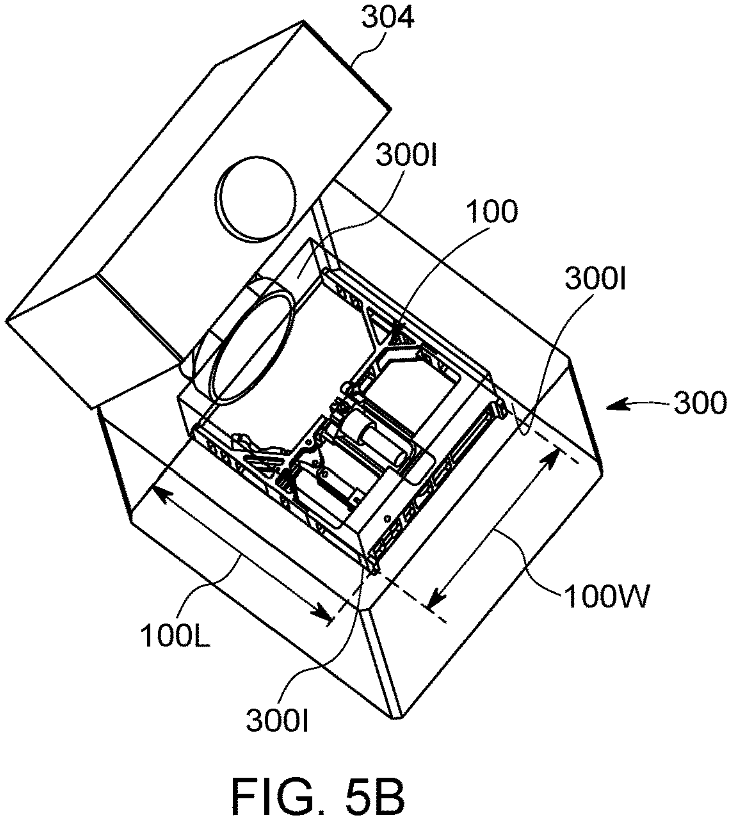

FIGS. 5A-5B are views of fixture assembly 100 having been securely placed in acoustic/anechoic chamber 300 for performing testing and/or calibration of a hearing device 10, according to an embodiment of the present invention. The length 100L and width 100W of the assembly 100 are configured so that the lengthwise ends and widthwise ends of the assembly 100 contact the inner walls 3001 of the chamber 300 so that the position of the assembly 100 relative to the chamber 300 is fixed and the assembly 100 cannot slide relative to the chamber 300 during use. As noted above, the length 100L and width 100W may be manufactured to fit the specifications of the length and width of a particular chamber 300 or, alternatively, the assembly 100 may be made so that the width 100W and/or length 100L are adjustable so as to fit one or more chambers 300 of varying dimensions. A test speaker 302 may be provided in chamber 300 that is configured to send out a test signal such as frequency sweeps, tones, noises, etc. that are used for testing the hearing device 10. The hearing device 10 is placed in front of the test speaker during testing, by virtue of its fixed position mounted to the frame 100 via acoustic coupler 106, as illustrated in FIG. 5B. The hearing device 10 positioned so as to receive the outputs of test speaker 302 as inputs to the hearing device 10 during testing.

Figure 6:
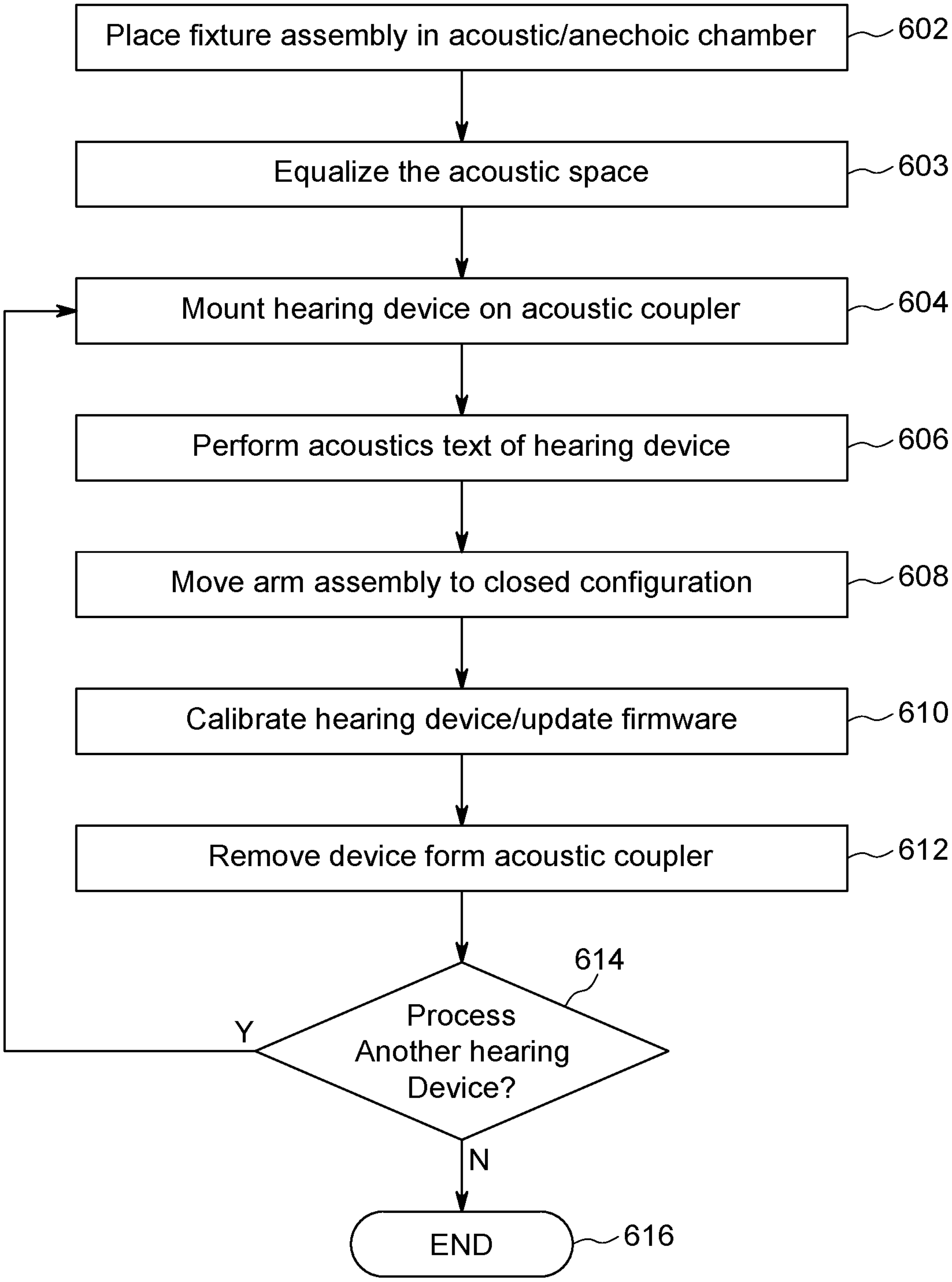
FIG. 6 shows events that may be carried out in a procedure for testing and calibration of a hearing device or a plurality of hearing devices in succession, according to an embodiment of the present invention.

FIG. 6 shows events that may be carried out in a procedure for testing and calibration of a hearing device 10 or a plurality of hearing devices 10 in succession, according to an embodiment of the present invention. It is noted that all process steps do not necessarily have to be carried out in the order described, unless specified as such. For example, fixture assembly 100 can be installed in acoustic chamber 300 before mounting a hearing device 10 to the acoustic coupler 106 or the hearing device 10 can be mounted to the acoustic coupler 106 before installing the fixture assembly 100 in the acoustic chamber 300.

Some of the events can be carried out as an automated process, while some may require manual assistance or be controlled completely manually. For example, in at least one embodiment the fixture assembly 100 can be placed in the chamber initially, either before or after mounting a hearing device 10 to the coupler 106. Once the fixture assembly 100 is placed, it need not be, and typically is not removed from the chamber over the course of testing a plurality of hearing devices 10 in succession. The hearing devices are mounted to the coupler 106 one after another, in succession, to serially perform testing of multiple hearing devices 10. Once a hearing device 10 is mounted to the coupler 106, an operator can initiate actuation of an automated process (such as by pressing a start button or otherwise actuating a switch or other actuation device, at which time the testing and calibration can be carried out in an automated fashion. Once the testing and/or calibration is completed for a hearing device 10, the software controlling the automated events of the process prompts the operator to remove the current hearing device 10 having been tested and/or calibrated. Once the hearing device 10 is manually removed, the operator can optionally mount another hearing device 10 to the coupler 106 and initiate the automated processing for the hearing device 10 having been newly added. Although the automated process is described in FIG. 6 as carrying out both acoustic testing and calibration as the default automated procedure, optionally it would be possible to automatically process for acoustic testing only, or calibration only.

At event 602, fixture assembly 100 is placed or installed in acoustic chamber 300 to establish a reference position and facilitate testing and calibration of one or more hearing devices 10. Although typically both acoustic testing and calibration are performed, the present invention can optionally be used to perform only one or the other of acoustic testing and calibration. As noted above, the fixture assembly 100 can be placed either prior to, or after mounting the first hearing device 10 to be tested to the coupler 106. At event 603 the lid 304 of the acoustic/anechoic chamber 300 is closed to acoustically seal the chamber and the acoustic space within the chamber 300 is equalized. The lid 304 can be closed manually or, alternatively may be an automated event so that it is automatically closed by the software controlled process. The equalization of acoustic space is typically a one-time event that is carried out prior to processing the first hearing device and a batch of hearing devices can be processed as desired, typically without the need to equalize again. Of course, the equalization could be carried out any number of times as desired. The chamber location, as well as the frame change the frequency response to an acoustic signal. The equalization process is carried out to adjust the frequency response so as to flatten it to compensate for the effects that the chambers and the frame have upon the frequency response. The correction factor(s) from equalization may be stored in the processing software and are used for each hearing device that is processed.

At event 604, if a hearing device was not mounted at event 602 for the first hearing device 10 to be processed, a hearing device 10 is mounted to an acoustic coupler 106 which has already been mounted to the frame 102 of the fixture assembly 100, either before or after insertion of the fixture assembly 100 into the acoustic chamber 300. For hearing devices after the first hearing device 10 processed, the next hearing device 10 to be processed is mounted at event 604, after removal of the hearing device 10 having already been processed. Preferably a diaphragm 120 is mounted into the acoustic coupler 106 as described above and used to align and acoustically seal the hearing device 10 to the acoustic coupler 106. It is noted that the arm 132 may be in the open position/configuration during this part of the process, as this eases the process of mounting the hearing device 10 to the acoustic coupler 106.

Next an acoustics test is performed on the hearing device 10 at event 606, with the arm 132 in the open configuration (like shown in FIG. 3). The arm assembly 130 when in the open configuration, provides an un-obstructive acoustic path between the hearing device 10 and the test speaker. The test speaker 302; generates and acoustically transmits a test signal to the microphone 14 of the hearing device 10 and therefore the acoustic pathway between the speaker and the microphone 14 needs to be unobstructed to obtain accurate and repeatable results, for measurement purposes. When an acoustics test is executed; the arm is in an open configuration. Further details of non-limiting examples of acoustic testing that can be performed are described in the Example below. It is noted that other standardized acoustic tests may be performed in addition to, or alternative to that described.

On the completion of acoustics test, the arm assembly 130 is actuated to move the arm 132 to the closed position at event 608. When updating firmware parameters to apply calibration offset or to go from ANSI test mode to shipment mode; the arm assembly is in the closed configuration The arm 132 when in the closed configuration provides a mechanism to communicate to the hearing device 10 via wireless communication such as Bluetooth using a communication protocol (such as via Eargo Charger Communication (ECC) protocol, for example) to update the hearing device firmware parameters and/or calibrate a transducers of the hearing device, e.g., apply calibration offset, calibrate system gains and/or other parameters.

After calibrating/updating firmware at event 610, the hearing device can be removed at event 612. At event 614 it is determined whether there is another hearing device 10 to be processed. If No, then the process ends at event 616. If Yes, then processing returns to event 603 for equalization and then at event 604 the next hearing device 10 to be processed is mounted on the acoustic coupler 106 and processing continues from there as described above.

The modular design of the frame allows it to be used in many different acoustical chambers having different dimensions. As noted above, the frame assembly/acoustics fixture assembly 100, in at least one embodiment, can be adjusted in length and/or width.

Figure 7:
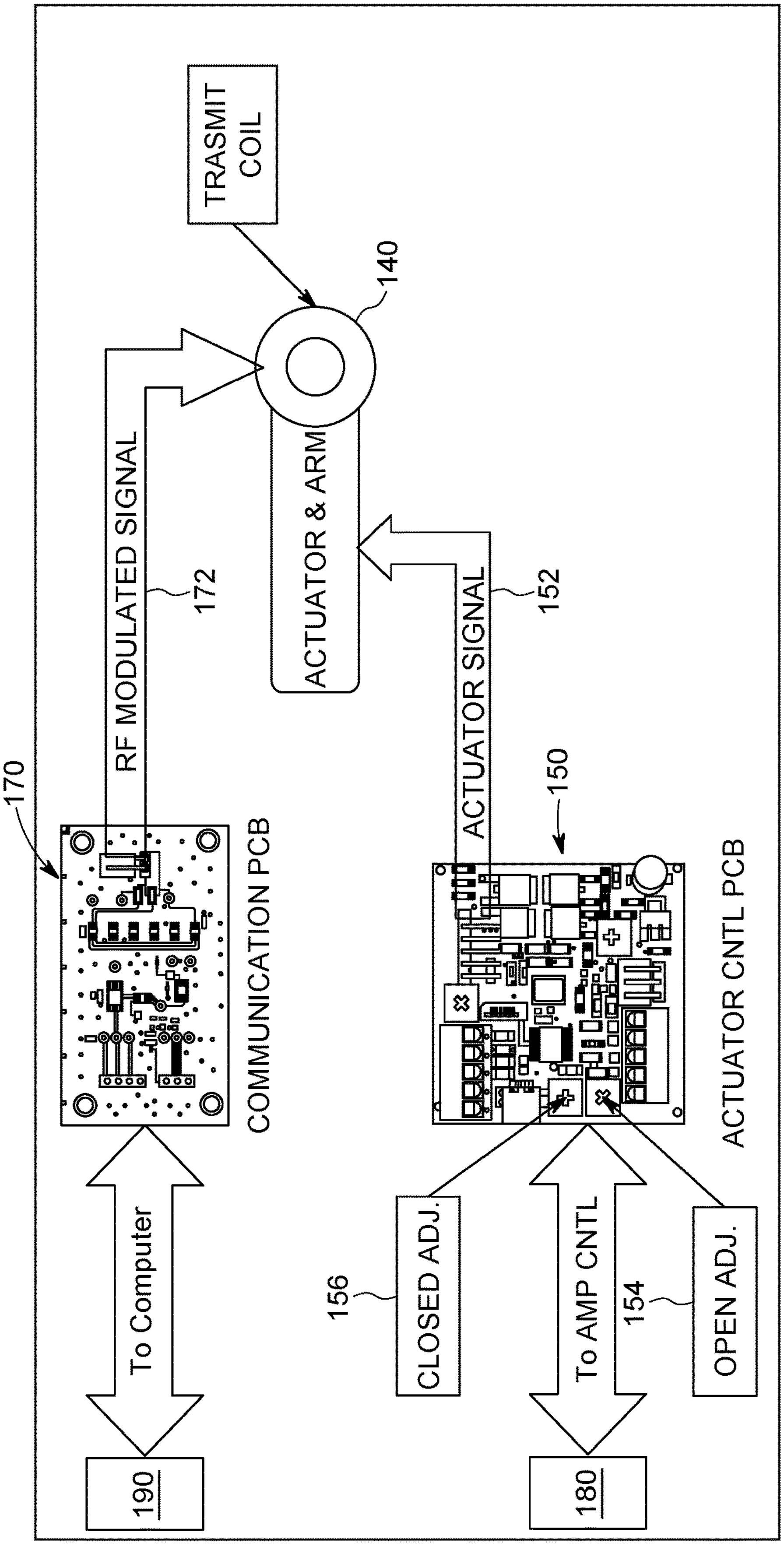
FIG. 7 shows two main modules of an electronics control system of an acoustics fixture assembly, and illustrates the interaction of the main modules with other components of the acoustic fixture assembly, according to an embodiment of the present invention.

The electronics control system of the acoustics fixture assembly 100 includes two main modules. FIG. 7 shows a flow chart illustrating the interaction of the main modules with other components of the acoustic fixture assembly 100. Actuator control module 150 interacts with the actuator 136 of the arm assembly to control movements of the arm 132. Communication module 170 interact with the transmit coil 140 on arm 132 to transmit communications from the transmit coil 140 to the receive coil 12 of the hearing device 10.

The actuator control module 150 provides an actuator signal 152 to operate the actuator 136 to accurately move and set the arm 132 positions (open and closed). As noted, by setting the arm to the open position, the arm 132 is moved out of the way to provide an unobstructed audio path from the anechoic chamber test speaker 302 to the microphone of hearing device 10. The end point location of the arm 132 in the open position can be adjusted by adjusting the open adjustment potentiometer 154 as shown in FIG. 7.

For the closed configuration, the actuator controller 150 provides an actuator control signal that drives the actuator 136 to position the arm 132 in the closed position/configuration. The closed configuration provides proximity for the wireless communication from the transmit coil 140 of the arm 132 to the receive coil 12 of the hearing device 10. The end point for the closed position is adjustable by adjusting the closed adjustment potentiometer 156 as shown in FIG. 7.

The actuator control module provides precise control of the speed of operating of the actuator 136, as well as controlling and setting the end point locations for the closed and open positions of the arm 132.

The signal 152 that controls the movement and position of the arm 132 is a result of processing by the actuator controller 150 of a signal received from an AMP controller 180. The AMP controller may send a low level signal, such as 0V, to set the arm 132 to the closed position, while sending a high level signal, such as 5V, to set the arm 132 to the open position. Alternatively the actuator controller 150 could be configured so that a high level signal received from the AMP controller 180 would be processed to output an actuator signal 152 to control movement of the arm 132 to the open position and a low level signal received from the AMP controller 180 would result in an actuator signal 152 to control movement of the arm 132 to the closed position.

The communication module 170 provides a communication path for data transfer to the hearing device 10 while the hearing device is mounted to the acoustic coupler and the arm 132 is in the closed position. A computer 190 (such as a desktop, laptop, smartphone, tablet or the like, which may run Windows, Mac, Linux, iOS, Android or other equivalent alternative operating system) can be used to control the communication module 170 by I2C protocol or other communications protocol, for setting RF frequency; and RS232 for modulated data. Although these are the preferred protocols, alternative interfaces could be used, which would require hardware and/or software modifications, as would be apparent to those of ordinary skill in art. The communication module 170 includes three main sections. In a first section, frequency selection is by a programmable clock used to set the frequency of interest. In a second section, a data modulator combines incoming data from RS232 with programmable clock output to establish a modulated RF signal. In the third section, an RF amplifier amplifies the modulated RF signals and drives the transmitter coil 140.

Thus, in communication mode, the RF signal is AM modulated 172 by RS232 data from the computer 190. The RF modulated signals 172 are then sent to the transmit coil 140 of the arm 132 which, in turn transmits the signals to the receive coil 12 of the hearing device 10.

The process controls of the actuator module 150 and communication module 170 can be automated so as not to require operator input and to thereby improve time efficiency for production lines.

Example

The following example is put forth so as to provide those of ordinary skill in the art with a complete disclosure and description of how to make and use the present invention, and is not intended to limit the scope of what the inventors regard as their invention nor are they intended to represent that the experiment below is all or the only experiment performed. Efforts have been made to ensure accuracy with respect to numbers used (e.g. amounts, temperature, etc.) but some experimental errors and deviations should be accounted for.

An acoustic test fixture 100 was constructed, configured and dimensioned so that the peripherals of the frame fit sit in an acoustic/anechoic chamber by Bruel & Kjaer BNK4232. A GRAS RA0038 acoustic coupler was fixed to the frame 102 using bracket coupler support 104 in a manner described above. Diaphragm 120 was mounted to the coupler. The acoustic test fixture 100 was placed in the acoustic chamber to orient the coupler in fixed positions relative to the inner walls of the acoustic chamber, as described above. An Eargo® 5 hearing aid 10 was then mounted to the coupler via the diaphragm in a manner as described above.

The acoustic test fixture and the hearing aid device were oriented in such a way that the microphone of the hearing aid device faced the speaker in the Bruel & Kjaer BNK4232 acoustics chamber.

Software programing scripts were written to execute the ANSI S3.22 acoustics test as well as to update firmware to go from production mode to ANSI test mode and from ANSI test mode to production mode. Additionally, the script also controlled the actuator and hence closing and opening of arm, communicated to the hearing aid device and wrote the calibration offset values to the firmware. ANSI S3.22 acoustics tests as described in the subsequent paragraphs were performed. However, the present invention is not limited to the ANSI S3.22 standard test. Additional tests as deemed necessary can be performed such as a frequency response test at 60 dBSPL input.

ANSI S3.22 acoustics test OSPL90 refers to the Output SPL obtained for 90-dB Input SPL signal. HFA-OSPL90 refers to the high frequency average of output SPL obtained at 1000 Hz, 1600 Hz and 2500 Hz as mentioned in the standard. Max OSPL90 refers to the maximum output SPL obtained from OSPL90 curve in the frequency range of 200-5000 Hz.

ANSI S3.22 acoustics test FOG50 refers to the Output gain obtained for a 50 dBSPL input SPL signal. HFA-FOG50 refers to the high frequency average output gain obtained at 1000 Hz, 1600 Hz and 2500 Hz as mentioned in the standard Frequency response 60 dBSPL refers to the Output SPL obtained for a 60-dBSPL input signal. This is a non-standard acoustics test ANSI S3.22 acoustics test Equivalent Input Noise (EIN) of the hearing aid system.

With the hearing device set in ANSI test mode; it measured $L_0$, the coupler SPL with the Bruel & Kjaer BNK4232 sound source turned off. A measurement bandwidth of 200 Hz to 5000 Hz and an averaging time of at least 0.5 seconds was used.

The Equivalent Input Noise (EIN) was calculated as $$EIN = L0 - \text{HFA-FOG50 dB SPL}$$

where HFA-FOG50 is the HFA acoustic gain for a 50 dB input SPL. HFA refers to "high frequency average". SPL refers to "sound pressure level".

ANSI S3.22 acoustics test Total Harmonic Distortion (THD) measures the distortion levels of the hearing aid system at specific frequencies.

With the hearing device set in ANSI test mode, the total harmonic distortion in the coupler output was measured and recorded for each of the following input levels and test frequencies: 70 dB SPL at 500 and 800 Hz and 65 dB SPL at 1600 Hz.

Percentage Total Harmonic Distortion (THD) was calculated using the following formula $$\% \text{ THD} = 100 \text{ v}(p^2{}_2 + p^2{}_3 + p^2{}_4 \ldots)/p^2{}_1$$

where $p_1$=sound pressure of the fundamental in the coupler and $p_2$, $p_3$, $p_4$, etc.=sound pressures of the second third, fourth, etc. harmonics, respectively, in the coupler.

FIGS. 8-11 show results of the acoustics testing once the devices are calibrated, as a result of the calibration and programming that were performed. The tolerances curves defined in FIGS. 8-10 were derived by testing multiple hearing aids over time and averaged to provide a single curve. The tolerance range/values defined in FIG.-11 are upper tolerance limits set beyond which the device is marked as failing.

Figure 8:
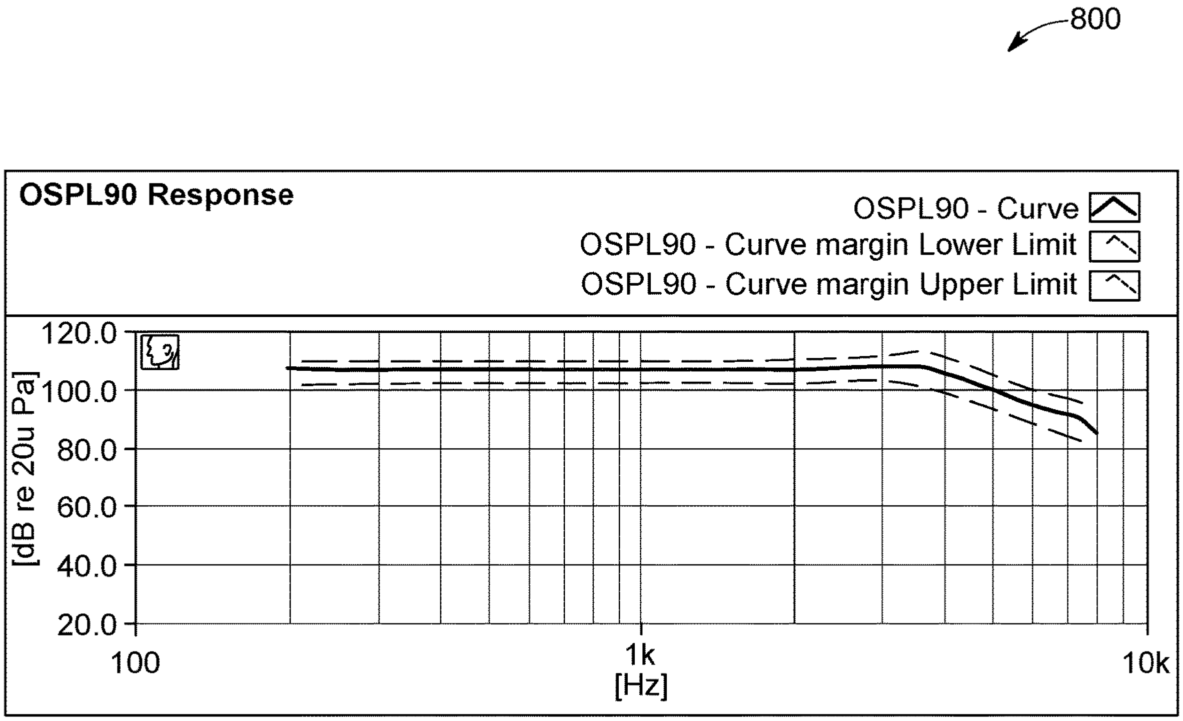
FIG. 8 is a graph showing the ANSI S3.22 OSPL90 (Output Sound Pressure Level 90) response from the below described Example performed as an embodiment of the present invention.

FIG. 8 is a graph 800 showing the ANSI S3.22 OSPL90 (Output Sound Pressure Level 90) response as a function of frequency. It shows the output response of the system for a 90 dBSPL input in ANSI test mode.

Figure 9:
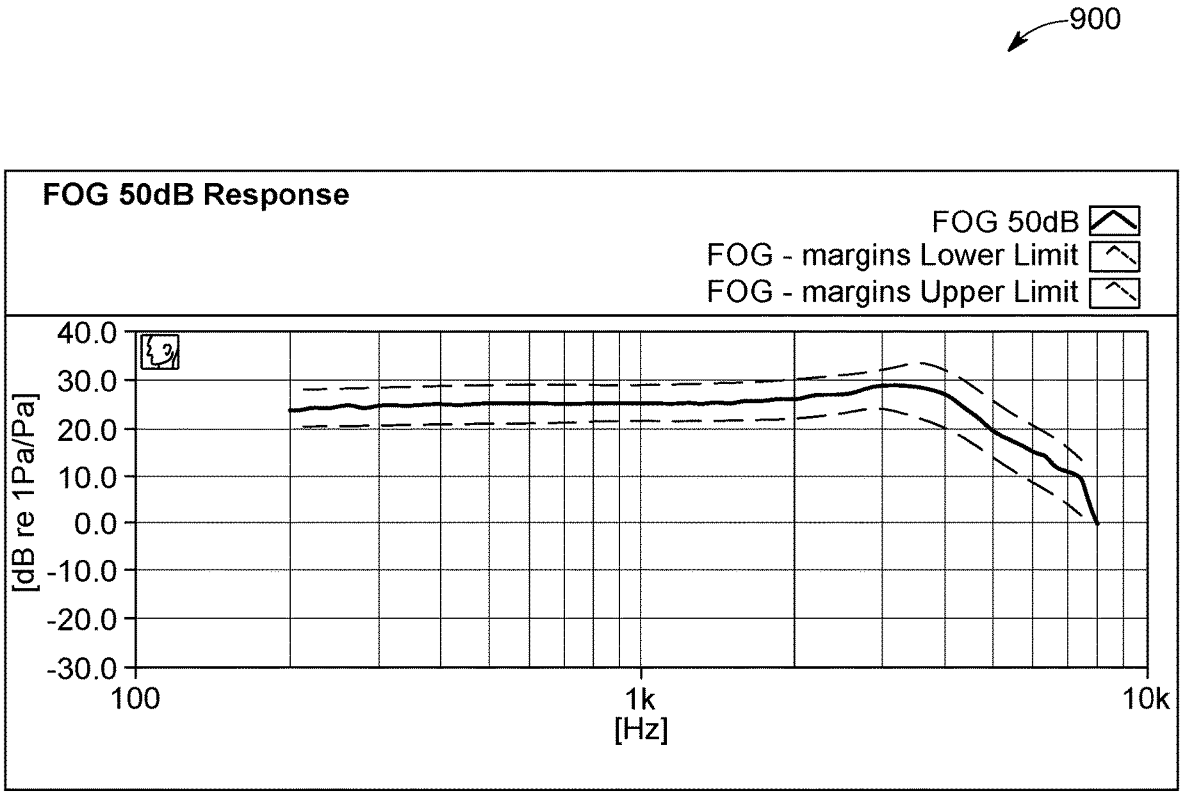
FIG. 9 is a graph showing Full on Gain (FOG) 50 dBSPL (decibels of sound pressure level) response measured during the testing performed in the below-described Example, according to an embodiment of the present invention.

FIG. 9 is a graph 900 showing ANSI S3.22 FOG50 (Full on Gain (FOG) measured at 50 dBSPL input) (decibels of sound pressure level) measured as a function of frequency. It shows the gain of the system at 50 dBSPL input in ANSI test mode response measured during the testing.

Figure 10:
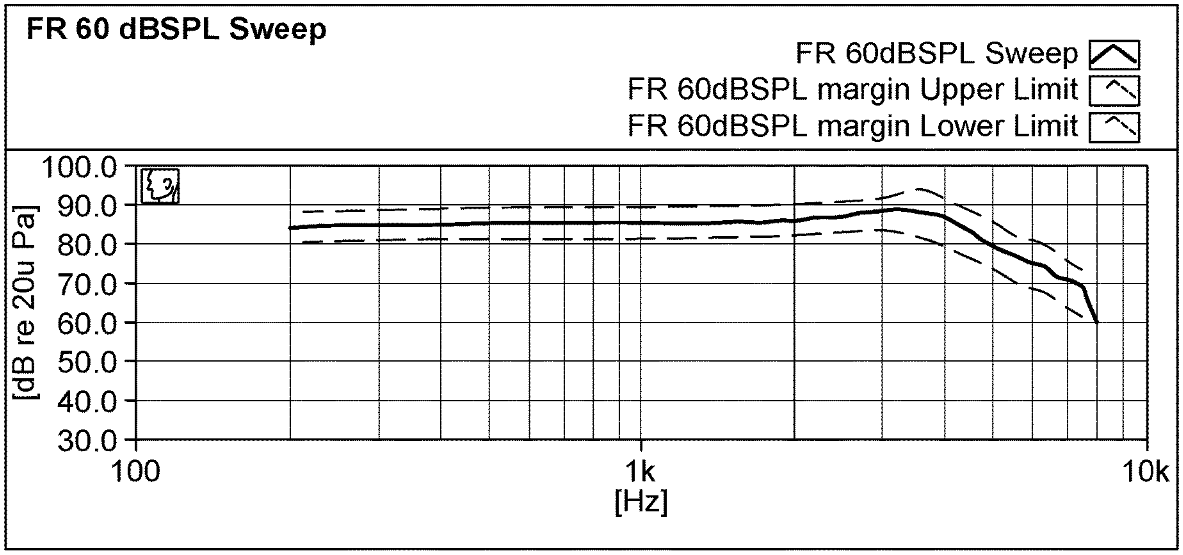
FIG. 10 is a graph 1000 showing the frequency response at 60 dBSPL measured during testing performed in the below-described Example, according to an embodiment of the present invention.

FIG. 10 is a graph 1000 showing the frequency response at 60 dBSPL measured during testing. FIG. 10 shows the frequency response at 60 dBSPL, that is, shows output at 60 dBSPL input as a function of frequencies.

FIG. 11 is a table 1100 showing results and tolerances defined for various other acoustics metrics characterizing the performance of the hearing aid 10 as tested and calibrated by this experiment. The HFA-OSPL90 is a value derived from the OSPL90 curve & measures the output level at 3 high frequency (1000 Hz, 1600 Hz & 2500 Hz) averages in ANSI test mode. The Max OSPL90 is the maximum output level for a 90 dBSPL input. The HFA-FOG value is the high frequency average gain number for a 50 dBSPL input derived from the FOG50 curve.

The Equivalent input noise (EIN) number shows how noisy the hearing aid system is. The lower the number, less noisy the system is and is calculated in accordance to the ANSI standard. The Total Harmonic Distortion (THD) measures the distortion of the hearing aid system in accordance to the ANSI standard.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. An acoustics fixture assembly facilitating manual and/or automated testing and/or calibration of a hearing device, said assembly comprising:

a frame configured and dimensioned to securely sit in an acoustic/anechoic chamber for performing the testing and/or calibration;

a bracket coupler support mounted on said frame and configured to receive and secure an acoustic coupler to said frame;

an arm assembly comprising an arm rotationally mounted to said frame; and an actuator configured to provide a driving force to drive rotation of said arm;

wherein, in a closed configuration, an end of said arm aligns with an opening in said bracket coupler support so that said end of said arm is aligned with a hearing device when mounted to the acoustic coupler when mounted in said bracket coupler support; and wherein, in an open configuration, said end of said arm is rotated away from alignment with said opening in said coupler support, so as not to interfere with acoustical testing of the hearing device when mounted to the acoustic coupler when mounted in said bracket coupler support.

2. The acoustics fixture assembly of claim 1, wherein a free end portion of said arm comprises a transmit coil configured to communicate with a receive coil in the hearing device when mounted in the acoustic coupler when mounted in said bracket coupler support, and when said arm assembly is in the closed configuration.

3. The acoustics fixture assembly of claim 1, further comprising the acoustic coupler secured by said bracket coupler support.

4. The acoustics fixture assembly of claim 3, further comprising the hearing device mounted to the acoustic coupler secured by said bracket coupler support.

5. The acoustics fixture assembly of claim 4, further comprising a diaphragm acoustically sealing the hearing device to the acoustics coupler.

6. The acoustics fixture assembly of claim 5, wherein a first end of said diaphragm is inserted into an end of said acoustic coupler, and an end of said hearing instrument is inserted into an opposite end of said diaphragm.

7. The acoustics fixture assembly of claim 1, wherein said frame is adjustable so that dimensions of said frame can be varied to fit in various sizes of acoustic/anechoic chambers.

8. The acoustics fixture assembly of claim 1, further comprising an electronics control system comprising an actuator control module configured to interact with said actuator to control movements of said arm.

9. The acoustics fixture assembly of claim 2, further comprising an electronics control system comprising:

an actuator control module configured to interact with said actuator to control movements of said arm; and a communication module configured to interact with said transmit coil to transmit communications from said transmit coil.

10. The acoustics fixture assembly of claim 1, wherein said acoustics fixture assembly is placed in the acoustic/anechoic chamber; and wherein the acoustic/anechoic chamber comprises inner walls and said frame contacts the inner walls, thereby preventing said acoustics fixture assembly from sliding and maintaining said acoustic fixture assembly in a fixed position relative to the acoustic/anechoic chamber.

11. The acoustics fixture assembly of claim 1, wherein the acoustic/anechoic chamber includes a test speaker configured to send out a test signal for acoustic testing of a hearing device when mounted to said frame via the acoustic coupler.

12. A method of testing and calibration of a hearing device, comprising:

installing an acoustics fixture assembly in an acoustic/anechoic chamber such that the acoustics fixture assembly securely sits in the acoustic/anechoic chamber, wherein the acoustics fixture assembly includes an acoustics coupler mounted to a frame of the acoustics fixture assembly;

mounting a hearing device to acoustics coupler;

closing the chamber and equalizing an acoustic space within the chamber;

performing an acoustics test on the hearing device while an arm of the arm assembly of the acoustics fixture assembly is in an open configuration;

automatically moving the arm from the open configuration to a closed configuration;

calibrating the hearing device;

automatically moving the arm from the closed configuration to the open configuration upon completion of said calibrating; and removing the hearing device from the acoustics coupler.

13. The method of claim 12, further comprising:

determining whether another hearing device is to be processed;

ending the method when it is determined that another hearing device is not to be processed; and when it is determined that another hearing device is to be processed, mounting another hearing device to the acoustics coupler, and repeating said closing, performing an acoustics test, automatically moving the arm to the closed position, calibrating, automatically moving the arm to the open configuration and removing the another hearing device.

14. The method of claim 12, wherein the acoustics testing and calibrating are automatically performed.

15. The method of claim 12, wherein said closing and equalizing are automatically performed.

16. The method of claim 12, wherein said calibrating is performed by wireless communication.

17. The method of claim 12, further comprising at least one of:

adjusting the width of the frame so that the frame fits in and contacts inner walls of the acoustic/anechoic chamber; and adjusting the length of the frame so that the frame fits in and contacts inner walls of the acoustic/anechoic chamber.

18. A system for facilitating manual and/or automated testing and/or calibration of a hearing device, said system comprising:

an acoustic/anechoic chamber having inner walls, a floor and a lid defining an acoustic chamber; and an acoustics fixture assembly comprising:

a frame configured and dimensioned to securely sit in said acoustic/anechoic chamber for performing the testing and/or calibration, wherein said frame contacts said inner walls, thereby preventing said acoustics fixture assembly from sliding, and maintaining said acoustic fixture assembly in a fixed position relative to said acoustic/anechoic chamber;

a bracket coupler support mounted on said frame and configured to receive and secure an acoustic coupler to said frame; and an arm assembly comprising an arm rotationally mounted to said frame and an actuator configured to provide a driving force to drive rotation of said arm;

wherein, in a closed configuration, an end of said arm aligns with an opening in said bracket coupler support so that said end of said arm is aligned with a hearing device when mounted to an acoustic coupler when mounted in said bracket coupler support; and wherein, in an open configuration, said end of said arm is rotated away from alignment with said opening in the coupler support, so as not to interfere with acoustical testing of the hearing device when mounted to the acoustic coupler when mounted in said bracket coupler support.

19. The system of claim 18, further comprising said acoustic coupler secured by said bracket coupler support.

20. The system of claim 19, further comprising said hearing device mounted to said acoustic coupler secured by said bracket coupler support.

21. The system of claim 20, further comprising a diaphragm acoustically sealing said hearing device to said acoustics coupler.

22. The system of claim 18, further comprising an electronics control system comprising:

an actuator control module configured to interact with said actuator to control movements of said arm; and a communication module configured to interact with a transmit coil on said arm to transmit communications from said transmit coil.

23. The system of claim 18, wherein said acoustic/anechoic chamber comprises a test speaker configured to send out a test signal for acoustic testing of the hearing device when mounted to said frame via said acoustic coupler.

* * * * *